United States Patent
Edsall et al.

(10) Patent No.: US 9,667,551 B2
(45) Date of Patent: May 30, 2017

(54) POLICY ENFORCEMENT PROXY

(71) Applicant: Cisco Technology, Inc., San Jose, CA (US)

(72) Inventors: Thomas J. Edsall, Los Gatos, CA (US); Navindra Yadav, Cupertino, CA (US); Kit Chiu Chu, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 224 days.

(21) Appl. No.: 14/532,787

(22) Filed: Nov. 4, 2014

(65) Prior Publication Data

US 2015/0124809 A1 May 7, 2015

Related U.S. Application Data (60) Provisional application No. 61/900,324, filed on Nov. 5, 2013.

(51) Int. Cl.
| | |
|---|---|
| *H04L 12/813* | (2013.01) |
| *H04L 12/46* | (2006.01) |
| *H04L 12/741* | (2013.01) |
| *H04L 12/823* | (2013.01) |
| *H04L 12/863* | (2013.01) |
| *H04L 12/24* | (2006.01) |
| *H04L 29/06* | (2006.01) |
| H04L 12/743 | (2013.01) |

(52) U.S. Cl.
CPC .......... *H04L 47/20* (2013.01); *H04L 12/4645* (2013.01); *H04L 41/0893* (2013.01); *H04L 45/74* (2013.01); *H04L 47/32* (2013.01); *H04L 47/62* (2013.01); *H04L 63/10* (2013.01); *H04L 63/164* (2013.01); *H04L 63/20* (2013.01); *H04L 45/7457* (2013.01)

(58) Field of Classification Search
CPC ... H04L 12/56; H04L 63/0227; H04L 63/101; H04L 63/104; H04L 63/105
See application file for complete search history.

(56) References Cited

U.S. PATENT DOCUMENTS

| | | | |
|---|---|---|---|
| 7,826,469 B1 | 11/2010 | Li et al. | |
| 2003/0035385 A1 | 2/2003 | Walsh et al. | |
| 2003/0097461 A1 | 5/2003 | Barham et al. | |
| 2003/0137940 A1 | 7/2003 | Schwartz et al. | |
| 2003/0231646 A1 | 12/2003 | Chandra et al. | |
| 2004/0062259 A1 | 4/2004 | Jeffries et al. | |
| 2004/0100901 A1 | 5/2004 | Bellows | |
| 2005/0055573 A1* | 3/2005 | Smith | G06F 21/6218 726/4 |
| 2006/0106750 A1* | 5/2006 | Smith | H04L 12/56 |
| 2006/0221835 A1 | 10/2006 | Sweeney | |

(Continued)

*Primary Examiner* — David Oveissi
(74) *Attorney, Agent, or Firm* — Polsinelli PC (57) ABSTRACT

Systems, methods, and non-transitory computer-readable storage media for implementing a policy enforcement proxy are disclosed. A data packet associated with a source endpoint group and a destination endpoint group is received at a network device. The network device performs a policy lookup based on the source endpoint group and the destination endpoint group. The network device determines that the policy is not available and in response, modifies the data packet and forwards it to a policy enforcement proxy.

20 Claims, 8 Drawing Sheets

(56) References Cited

U.S. PATENT DOCUMENTS

| | | |
|---|---|---|
| 2007/0223372 A1 | 9/2007 | Haalen et al. |
| 2008/0031247 A1 | 2/2008 | Tahara et al. |
| 2009/0049196 A1* | 2/2009 | Smith .................... H04L 63/08 709/245 |
| 2009/0122805 A1 | 5/2009 | Epps et al. |
| 2011/0158248 A1 | 6/2011 | Vorunganti et al. |
| 2011/0310738 A1 | 12/2011 | Lee et al. |
| 2012/0063318 A1 | 3/2012 | Boddu et al. |
| 2015/0124824 A1 | 5/2015 | Edsall et al. |

* cited by examiner

POLICY ENFORCEMENT PROXY

CROSS-REFERENCE TO RELATED APPLICATION

This application claims priority to U.S. Provisional Application 61/900,324, filed Nov. 5, 2013, the disclosure of which is incorporated herein by reference in its entirety.

TECHNICAL FIELD

This disclosure relates in general to the field of computer networks and, more particularly, pertains to a policy enforcement proxy.

BACKGROUND

The proliferation of electronic communication devices such as laptop computers, tablets, cellular phones, desktop computers, etc. has significantly increased the scale and complexity of computer networks. As the number of devices in networks increase, the task of routing data to and from each of the devices becomes more burdensome. In particular, network complexity can overextend the hardware and software resources responsible for performing network routing.

Many networking platforms utilize a policy table to implement rules that control the flow of network traffic. The size of the policy table can limit the scalability of the network as it grows in size and complexity. Furthermore, it is not feasible to simply populate every network switch with a high-capacity memory device to avoid running out of room for the policy table.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DESCRIPTION OF EXAMPLE EMBODIMENTS

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview:

The subject technology provides embodiments for systems, methods, and non-transitory computer-readable storage media for implementing a policy enforcement proxy. The method includes receiving a data packet at a network device and determining its source endpoint group and its destination endpoint group. Based on the source endpoint group and the destination endpoint group, the network device can perform a policy lookup for the data packet. Upon determining that an appropriate policy is not available, the network device can modify the data packet and forward it to a policy enforcement proxy for further processing.

In a further method embodiment, a policy enforcement proxy can receive the data packet from a network switch and de-encapsulate it to determine the source endpoint group and the destination endpoint group. Based on the source endpoint group and the destination endpoint group, the policy enforcement proxy can identify and apply/enforce an appropriate policy on the data packet.

DETAILED DESCRIPTION

A computer network is a geographically distributed collection of nodes interconnected by communication links and segments for transporting data between endpoints, such as personal computers and workstations. Many types of networks are available, with the types ranging from local area networks (LANs) and wide area networks (WANs) to overlay and software-defined networks, such as virtual extensible local area networks (VXLANs).

LANs typically connect nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. LANs and WANs can include layer 2 (L2) and/or layer 3 (L3) networks and devices.

The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol can refer to a set of rules defining how the nodes interact with each other. Computer networks may be further interconnected by an intermediate network node, such as a router, to extend the effective "size" of each network.

Overlay networks generally allow virtual networks to be created and layered over a physical network infrastructure. Overlay network protocols, such as Virtual Extensible LAN (VXLAN), Network Virtualization using Generic Routing Encapsulation (NVGRE), Network Virtualization Overlays (NVO3), and Stateless Transport Tunneling (STT), provide a traffic encapsulation scheme which allows network traffic to be carried across L2 and L3 networks over a logical tunnel. Such logical tunnels can be originated and terminated through virtual tunnel end points (VTEPs).

Moreover, overlay networks can include virtual segments, such as VXLAN segments in a VXLAN overlay network, which can include virtual L2 and/or L3 overlay networks over which virtual machines (VMs) communicate. The virtual segments can be identified through a virtual network identifier (VNI), such as a VXLAN network identifier, which can specifically identify an associated virtual segment or domain.

Network virtualization allows hardware and software resources to be combined in a virtual network. For example, network virtualization can allow multiple numbers of VMs to be attached to the physical network via respective virtual LANs (VLANs). The VMs can be grouped according to their respective VLAN, and can communicate with other VMs as well as other devices on the internal or external network.

Network segments, such as physical or virtual segments; networks; devices; ports; physical or logical links; and/or traffic in general can be grouped into a bridge or flood domain. A bridge domain or flood domain can represent a broadcast domain, such as an L2 broadcast domain. A bridge domain or flood domain can include a single subnet, but can also include multiple subnets. Moreover, a bridge domain can be associated with a bridge domain interface on a network device, such as a switch. A bridge domain interface can be a logical interface which supports traffic between an L2 bridged network and an L3 routed network. In addition, a bridge domain interface can support internet protocol (IP) termination, VPN termination, address resolution handling, MAC addressing, etc. Both bridge domains and bridge domain interfaces can be identified by a same index or identifier.

Furthermore, endpoint groups (EPGs) can be used in a network for mapping applications to the network. In particular, EPGs can use a grouping of application endpoints in a network to apply connectivity and policy to the group of applications. EPGs can act as a container for buckets or collections of applications, or application components, and tiers for implementing forwarding and policy logic. EPGs also allow separation of network policy, security, and forwarding from addressing by instead using logical application boundaries.

Cloud computing can also be provided in one or more networks to provide computing services using shared resources. Cloud computing can generally include Internet-based computing in which computing resources are dynamically provisioned and allocated to client or user computers or other devices on-demand, from a collection of resources available via the network (e.g., "the cloud"). Cloud computing resources, for example, can include any type of resource, such as computing, storage, and network devices, virtual machines (VMs), etc. For instance, resources may include service devices (firewalls, deep packet inspectors, traffic monitors, load balancers, etc.), compute/processing devices (servers, CPU's, memory, brute force processing capability), storage devices (e.g., network attached storages, storage area network devices), etc. In addition, such resources may be used to support virtual networks, virtual machines (VM), databases, applications (Apps), etc.

Cloud computing resources may include a "private cloud," a "public cloud," and/or a "hybrid cloud." A "hybrid cloud" can be a cloud infrastructure composed of two or more clouds that inter-operate or federate through technology. In essence, a hybrid cloud is an interaction between private and public clouds where a private cloud joins a public cloud and utilizes public cloud resources in a secure and scalable manner. Cloud computing resources can also be provisioned via virtual networks in an overlay network, such as a VXLAN.

The disclosed technology addresses the need in the art for improving the scalability of the policy table in computer networks. Disclosed are systems and methods for implementing and enforcing network policies by using a policy enforcement proxy. A brief introductory description of an exemplary systems and networks, as illustrated in FIGS. 1 through 4, is disclosed herein. A detailed description of the policy enforcement proxy, and example variations, will then follow. These variations shall be described as the various embodiments are set forth. The disclosure now turns to FIG. 1.

Figure 1:
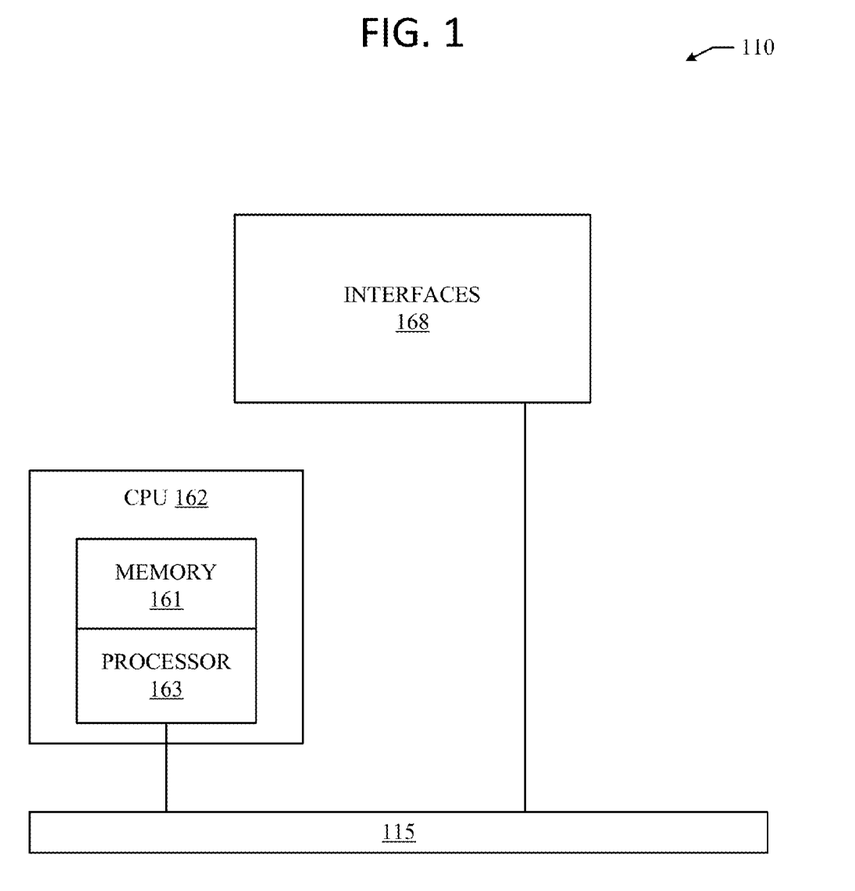
FIG. 1 illustrates an example network device according to some aspects of the subject technology.

FIG. 1 illustrates an exemplary network device 110 suitable for implementing the present invention. Network device 110 includes a master central processing unit (CPU) 162, interfaces 168, and a bus 115 (e.g., a PCI bus). When acting under the control of appropriate software or firmware, the CPU 162 is responsible for executing packet management, error detection, and/or routing functions, such policy enforcement, for example. The CPU 162 preferably accomplishes all these functions under the control of software including an operating system and any appropriate applications software. CPU 162 may include one or more processors 163 such as a processor from the Motorola family of microprocessors or the MIPS family of microprocessors. In an alternative embodiment, processor 163 is specially designed hardware for controlling the operations of router 110. In a specific embodiment, a memory 161 (such as non-volatile RAM and/or ROM) also forms part of CPU 162. However, there are many different ways in which memory could be coupled to the system.

The interfaces 168 are typically provided as interface cards (sometimes referred to as "line cards"). Generally, they control the sending and receiving of data packets over the network and sometimes support other peripherals used with the network device 110. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control, and management. By providing separate processors for the communications intensive tasks, these interfaces allow the master microprocessor 162 to efficiently perform routing computations, network diagnostics, security functions, etc.

Although the system shown in FIG. 1 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 161) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

Figure 2A:
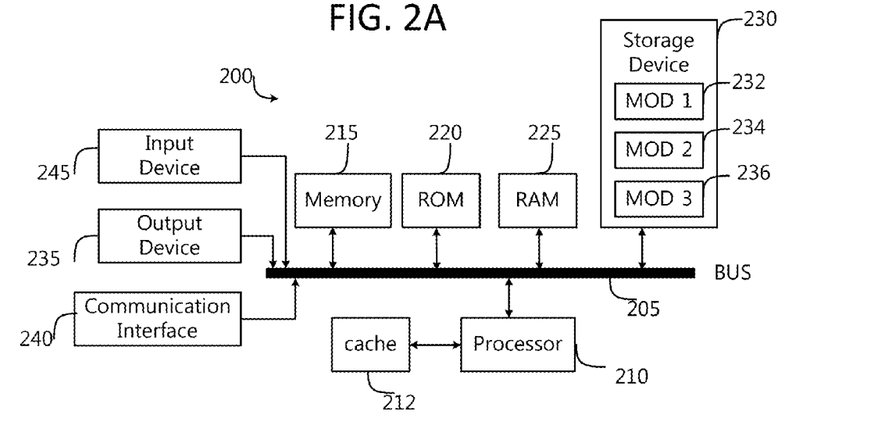
FIGS. 2A and 2B illustrate an example system embodiments according to some aspects of the subject technology.
Figure 2B:
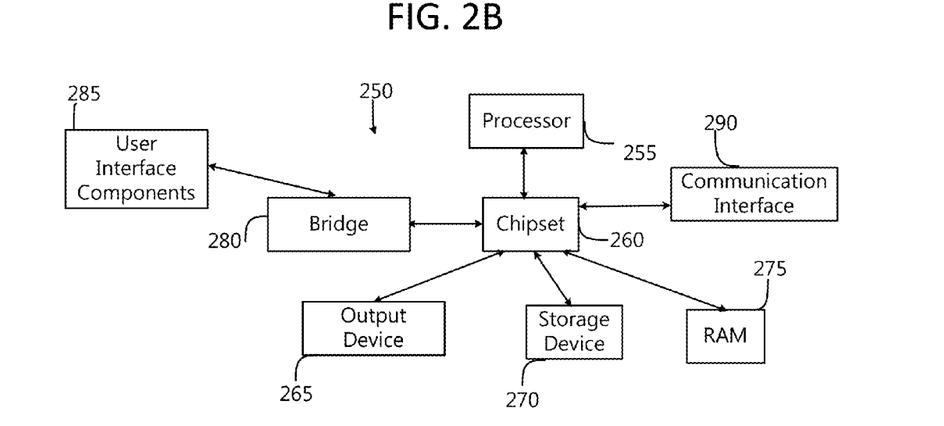

FIG. 2A, and FIG. 2B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 2A illustrates a conventional system bus computing system architecture 200 wherein the components of the system are in electrical communication with each other using a bus 205. Exemplary system 200 includes a processing unit (CPU or processor) 210 and a system bus 205 that couples various system components including the system memory 215, such as read only memory (ROM) 220 and random access memory (RAM) 225, to the processor 210. The system 200 can include a cache of high-speed memory connected directly with, in close proximity to, or integrated as part of the processor 210. The system 200 can copy data from the memory 215 and/or the storage device 230 to the cache 212 for quick access by the processor 210. In this way, the cache can provide a performance boost that avoids processor 210 delays while waiting for data. These and other modules can control or be configured to control the processor 210 to perform various actions. Other system memory 215 may be available for use as well. The memory 215 can include multiple different types of memory with different performance characteristics. The processor 210 can include any general purpose processor and a hardware module or software module, such as module 1 232, module 2 234, and module 3 236 stored in storage device 230, configured to control the processor 210 as well as a special-purpose processor where software instructions are incorporated into the actual processor design. The processor 210 may essentially be a completely self-contained computing system, containing multiple cores or processors, a bus, memory controller, cache, etc. A multi-core processor may be symmetric or asymmetric.

To enable user interaction with the computing device 200, an input device 245 can represent any number of input mechanisms, such as a microphone for speech, a touch-sensitive screen for gesture or graphical input, keyboard, mouse, motion input, speech and so forth. An output device 235 can also be one or more of a number of output mechanisms known to those of skill in the art. In some instances, multimodal systems can enable a user to provide multiple types of input to communicate with the computing device 200. The communications interface 240 can generally govern and manage the user input and system output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof.

The storage device 230 can include software modules 232, 234, 236 for controlling the processor 210. Other hardware or software modules are contemplated. The storage device 230 can be connected to the system bus 205. In one aspect, a hardware module that performs a particular function can include the software component stored in a computer-readable medium in connection with the necessary hardware components, such as the processor 210, bus 205, display 235, and so forth, to carry out the function.

FIG. 2B illustrates a computer system 250 having a chipset architecture that can be used in executing the described method and generating and displaying a graphical user interface (GUI). Computer system 250 is an example of computer hardware, software, and firmware that can be used to implement the disclosed technology. System 250 can include a processor 255, representative of any number of physically and/or logically distinct resources capable of executing software, firmware, and hardware configured to perform identified computations. Processor 255 can communicate with a chipset 260 that can control input to and output from processor 255. In this example, chipset 260 outputs information to output 265, such as a display, and can read and write information to storage device 270, which can include magnetic media, and solid state media, for example. Chipset 260 can also read data from and write data to RAM 275. A bridge 280 for interfacing with a variety of user interface components 285 can be provided for interfacing with chipset 260. Such user interface components 285 can include a keyboard, a microphone, touch detection and processing circuitry, a pointing device, such as a mouse, and so on. In general, inputs to system 250 can come from any of a variety of sources, machine generated and/or human generated.

Chipset 260 can also interface with one or more communication interfaces 290 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 255 analyzing data stored in storage 270 or 275. Further, the machine can receive inputs from a user via user interface components 285 and execute appropriate functions, such as browsing functions by interpreting these inputs using processor 255.

It can be appreciated that exemplary systems 200 and 250 can have more than one processor 210 or be part of a group or cluster of computing devices networked together to provide greater processing capability.

Figure 3:
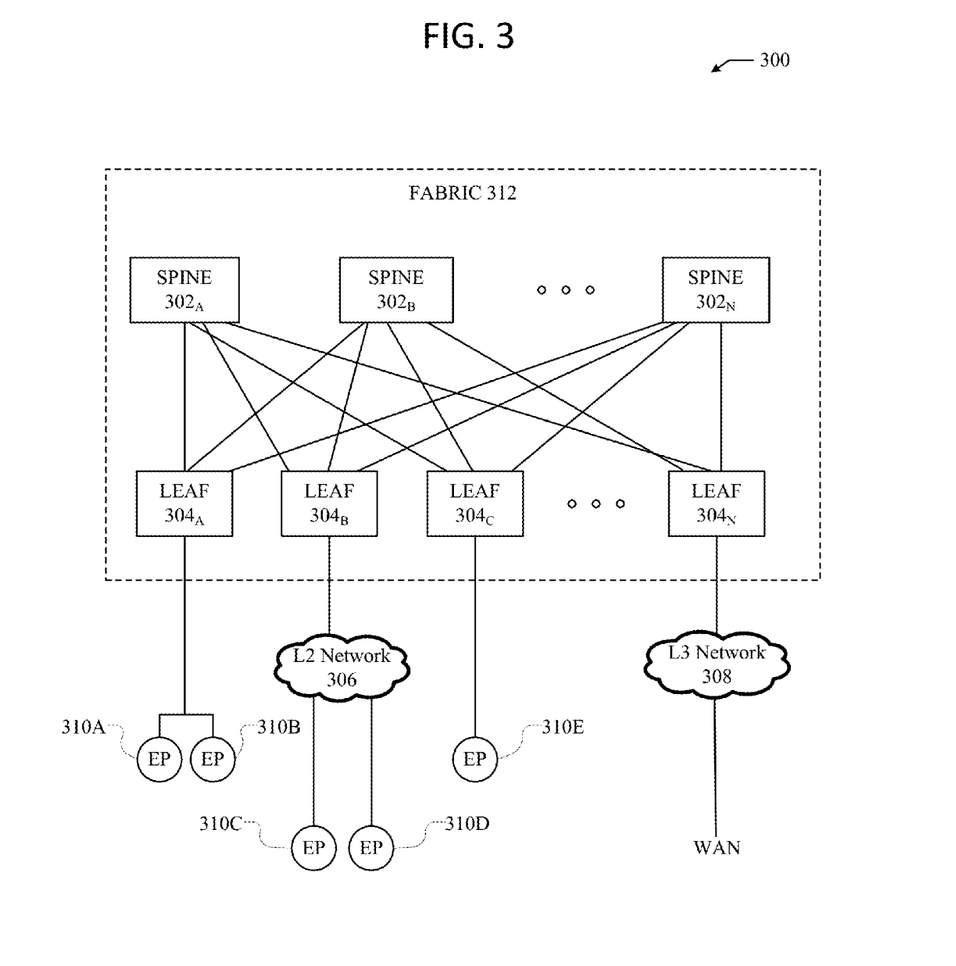
FIG. 3 illustrates a schematic block diagram of an example architecture for a network fabric.

FIG. 3 illustrates a schematic block diagram of an example architecture 300 for a network fabric 312. The network fabric 312 can include spine switches $302_A$, $302_B$, ..., $302_N$ (collectively "302") connected to leaf switches $304_A$, $304_B$, $304_C$ ... $304_N$ (collectively "304") in the network fabric 312.

Spine switches 302 can be L3 switches in the fabric 312. However, in some cases, the spine switches 302 can also, or otherwise, perform L2 functionalities. Further, the spine switches 302 can support various capabilities, such as 40 or 10 Gbps Ethernet speeds. To this end, the spine switches 302 can include one or more 40 Gigabit Ethernet ports. Each port can also be split to support other speeds. For example, a 40 Gigabit Ethernet port can be split into four 10 Gigabit Ethernet ports.

In some embodiments, one or more of the spine switches 302 can be configured to host a proxy function that performs a lookup of the endpoint address identifier to locator mapping in a mapping database on behalf of leaf switches 304 that do not have such mapping. The proxy function can do this by parsing through the packet to the encapsulated, tenant packet to get to the destination locator address of the tenant. The spine switches 302 can then perform a lookup of their local mapping database to determine the correct locator address of the packet and forward the packet to the locator address without changing certain fields in the header of the packet.

When a packet is received at a spine switch $302_i$, the spine switch $302_i$ can first check if the destination locator address is a proxy address. If so, the spine switch $302_i$ can perform the proxy function as previously mentioned. If not, the spine switch $302_i$ can look up the locator in its forwarding table and forward the packet accordingly.

Spine switches 302 connect to leaf switches 304 in the fabric 312. Leaf switches 304 can include access ports (or non-fabric ports) and fabric ports. Fabric ports can provide uplinks to the spine switches 302, while access ports can provide connectivity for devices, hosts, endpoints, VMs, or external networks to the fabric 312.

Leaf switches 304 can reside at the edge of the fabric 312, and can thus represent the physical network edge. In some cases, the leaf switches 304 can be top-of-rack ("ToR") switches configured according to a ToR architecture. In other cases, the leaf switches 304 can be aggregation switches in any particular topology, such as end-of-row (EoR) or middle-of-row (MoR) topologies. The leaf switches 304 can also represent aggregation switches, for example.

The leaf switches 304 can be responsible for routing and/or bridging the tenant packets and applying network policies. In some cases, a leaf switch can perform one or more additional functions, such as implementing a mapping cache, sending packets to the proxy function when there is a miss in the cache, encapsulate packets, enforce ingress or egress policies, etc.

Moreover, the leaf switches 304 can contain virtual switching functionalities, such as a virtual tunnel endpoint (VTEP) function as explained below in the discussion of VTEP 408 in FIG. 4. To this end, leaf switches 304 can connect the fabric 312 to an overlay network, such as overlay network 400 illustrated in FIG. 4.

Network connectivity in the fabric 312 can flow through the leaf switches 304. Here, the leaf switches 304 can provide servers, resources, endpoints, external networks, or VMs access to the fabric 312, and can connect the leaf switches 304 to each other. In some cases, the leaf switches 304 can connect EPGs to the fabric 312 and/or any external networks. Each EPG can connect to the fabric 312 via one of the leaf switches 304, for example.

Endpoints 310A-E (collectively "310") can connect to the fabric 312 via leaf switches 304. For example, endpoints 310A and 310B can connect directly to leaf switch 304A, which can connect endpoints 310A and 310B to the fabric 312 and/or any other one of the leaf switches 304. Similarly, endpoint 310E can connect directly to leaf switch 304C, which can connect endpoint 310E to the fabric 312 and/or any other of the leaf switches 304. On the other hand, endpoints 310C and 310D can connect to leaf switch 304B via L2 network 306. Similarly, the wide area network (WAN) can connect to the leaf switches 304C or 304D via L3 network 308.

Endpoints 310 can include any communication device, such as a computer, a server, a switch, a router, etc. In some cases, the endpoints 310 can include a server, hypervisor, or switch configured with a VTEP functionality which connects an overlay network, such as overlay network 400 below, with the fabric 312. For example, in some cases, the endpoints 310 can represent one or more of the VTEPs 408A-D illustrated in FIG. 4. Here, the VTEPs 408A-D can connect to the fabric 312 via the leaf switches 304. The overlay network can host physical devices, such as servers, applications, EPGs, virtual segments, virtual workloads, etc. In addition, the endpoints 310 can host virtual workload(s), clusters, and applications or services, which can connect with the fabric 312 or any other device or network, including an external network. For example, one or more endpoints 310 can host, or connect to, a cluster of load balancers or an EPG of various applications.

Although the fabric 312 is illustrated and described herein as an example leaf-spine architecture, one of ordinary skill in the art will readily recognize that the subject technology can be implemented based on any network fabric, including any data center or cloud network fabric. Indeed, other architectures, designs, infrastructures, and variations are contemplated herein.

Figure 4:
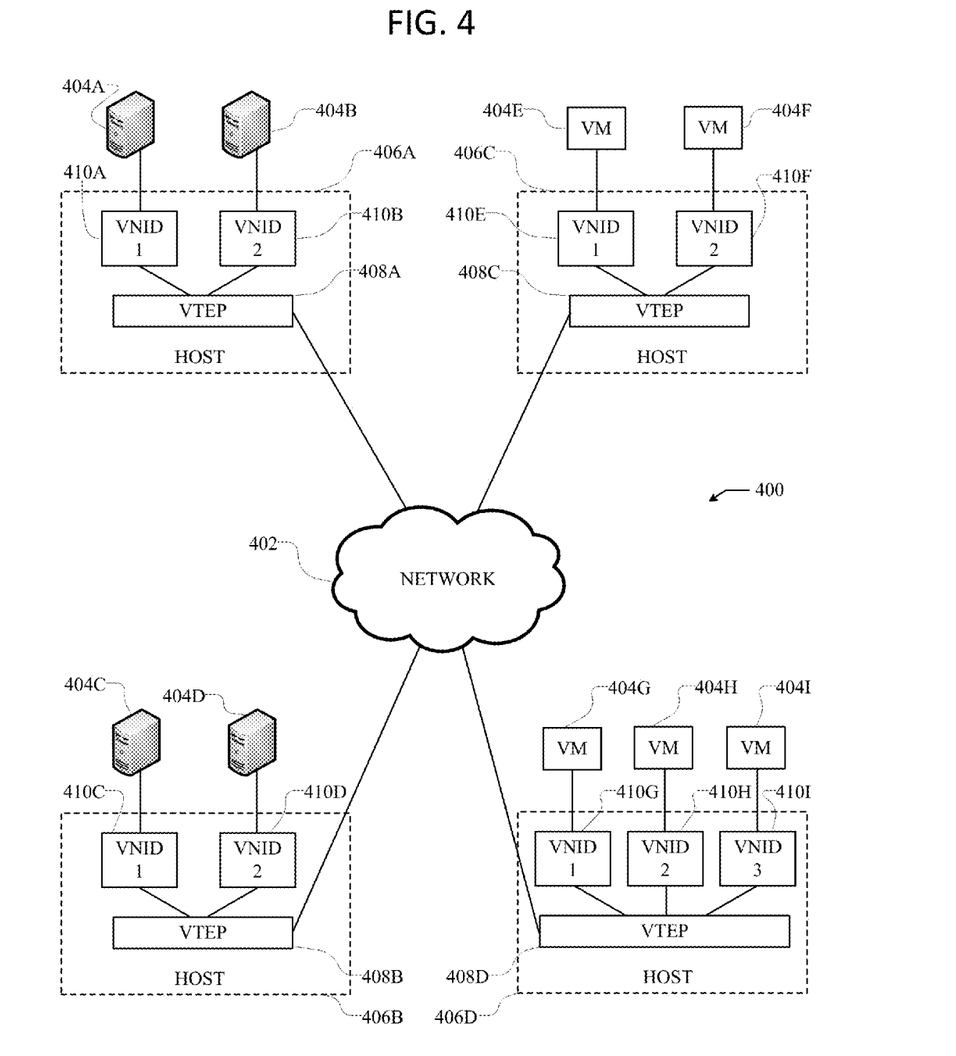
FIG. 4 illustrates an example overlay network.

FIG. 4 illustrates an exemplary overlay network 400. Overlay network 400 uses an overlay protocol, such as VXLAN, VGRE, VO3, or STT, to encapsulate traffic in L2 and/or L3 packets which can cross overlay L3 boundaries in the network. As illustrated in FIG. 4, overlay network 400 can include hosts 406A-D interconnected via network 402.

Network 402 can include a packet network, such as an IP network, for example. Moreover, network 402 can connect the overlay network 400 with the fabric 312 in FIG. 3. For example, VTEPs 408A-D can connect with the leaf switches 304 in the fabric 312 via network 402.

Hosts 406A-D include virtual tunnel end points (VTEP) 408A-D, which can be virtual nodes or switches configured to encapsulate and de-encapsulate data traffic according to a specific overlay protocol of the network 400, for the various virtual network identifiers (VNIDs) 410A-I. Moreover, hosts 406A-D can include servers containing a VTEP functionality, hypervisors, and physical switches, such as L3 switches, configured with a VTEP functionality. For example, hosts 406A and 406B can be physical switches configured to run VTEPs 408A-B. Here, hosts 406A and 406B can be connected to servers 404A-D, which, in some cases, can include virtual workloads through VMs loaded on the servers, for example.

In some embodiments, network 400 can be a VXLAN network, and VTEPs 408A-D can be VXLAN tunnel end points (VTEP). However, as one of ordinary skill in the art will readily recognize, network 400 can represent any type of overlay or software-defined network, such as NVGRE, STT, or even overlay technologies yet to be invented.

The VNIDs can represent the segregated virtual networks in overlay network 400. Each of the overlay tunnels (VTEPs 408A-D) can include one or more VNIDs. For example, VTEP 408A can include VNIDs 1 and 2, VTEP 408B can include VNIDs 1 and 2, VTEP 408C can include VNIDs 1 and 2, and VTEP 408D can include VNIDs 1-3. As one of ordinary skill in the art will readily recognize, any particular VTEP can, in other embodiments, have numerous VNIDs, including more than the 3 VNIDs illustrated in FIG. 4.

The traffic in overlay network 400 can be segregated logically according to specific VNIDs. This way, traffic intended for VNID 1 can be accessed by devices residing in VNID 1, while other devices residing in other VNIDs (e.g., VNIDs 2 and 3) can be prevented from accessing such traffic. In other words, devices or endpoints connected to specific VNIDs can communicate with other devices or endpoints connected to the same specific VNIDs, while traffic from separate VNIDs can be isolated to prevent devices or endpoints in other specific VNIDs from accessing traffic in different VNIDs.

Servers 404A-D and VMs 404E-I can connect to their respective VNID or virtual segment, and communicate with other servers or VMs residing in the same VNID or virtual segment. For example, server 404A can communicate with server 404C and VMs 404E and 404G because they all reside in the same VNID, viz., VNID 1. Similarly, server 404B can communicate with VMs 404F and 404H because they all reside in VNID 2. VMs 404E-I can host virtual workloads, which can include application workloads, resources, and services, for example. However, in some cases, servers 404A-D can similarly host virtual workloads through VMs hosted on the servers 404A-D. Moreover, each of the servers 404A-D and VMs 404E-I can represent a single server or VM, but can also represent multiple servers or VMs, such as a cluster of servers or VMs.

VTEPs 408A-D can encapsulate packets directed at the various VNIDs 1-3 in the overlay network 400 according to the specific overlay protocol implemented, such as VXLAN, so traffic can be properly transmitted to the correct VNID and recipient(s). Moreover, when a switch, router, or other network device receives a packet to be transmitted to a recipient in the overlay network 400, it can analyze a routing table, such as a lookup table, to determine where such packet needs to be transmitted so the traffic reaches the appropriate recipient. For example, if VTEP 408A receives a packet from endpoint 404B that is intended for endpoint 404H, VTEP 408A can analyze a routing table that maps the intended endpoint, endpoint 404H, to a specific switch that is configured to handle communications intended for endpoint 404H. VTEP 408A might not initially know, when it receives the packet from endpoint 404B, that such packet should be transmitted to VTEP 408D in order to reach endpoint 404H. Accordingly, by analyzing the routing table, VTEP 408A can lookup endpoint 404H, which is the intended recipient, and determine that the packet should be transmitted to VTEP 408D, as specified in the routing table based on endpoint-to-switch mappings or bindings, so the packet can be transmitted to, and received by, endpoint 404H as expected.

However, continuing with the previous example, in many instances, VTEP 408A may analyze the routing table and fail to find any bindings or mappings associated with the intended recipient, e.g., endpoint 404H. Here, the routing table may not yet have learned routing information regarding endpoint 404H. In this scenario, the VTEP 408A may likely broadcast or multicast the packet to ensure the proper switch associated with endpoint 404H can receive the packet and further route it to endpoint 404H.

In some cases, the routing table can be dynamically and continuously modified by removing unnecessary or stale entries and adding new or necessary entries, in order to maintain the routing table up-to-date, accurate, and efficient, while reducing or limiting the size of the table.

As one of ordinary skill in the art will readily recognize, the examples and technologies provided above are simply for clarity and explanation purposes, and can include many additional concepts and variations.

Figure 5:
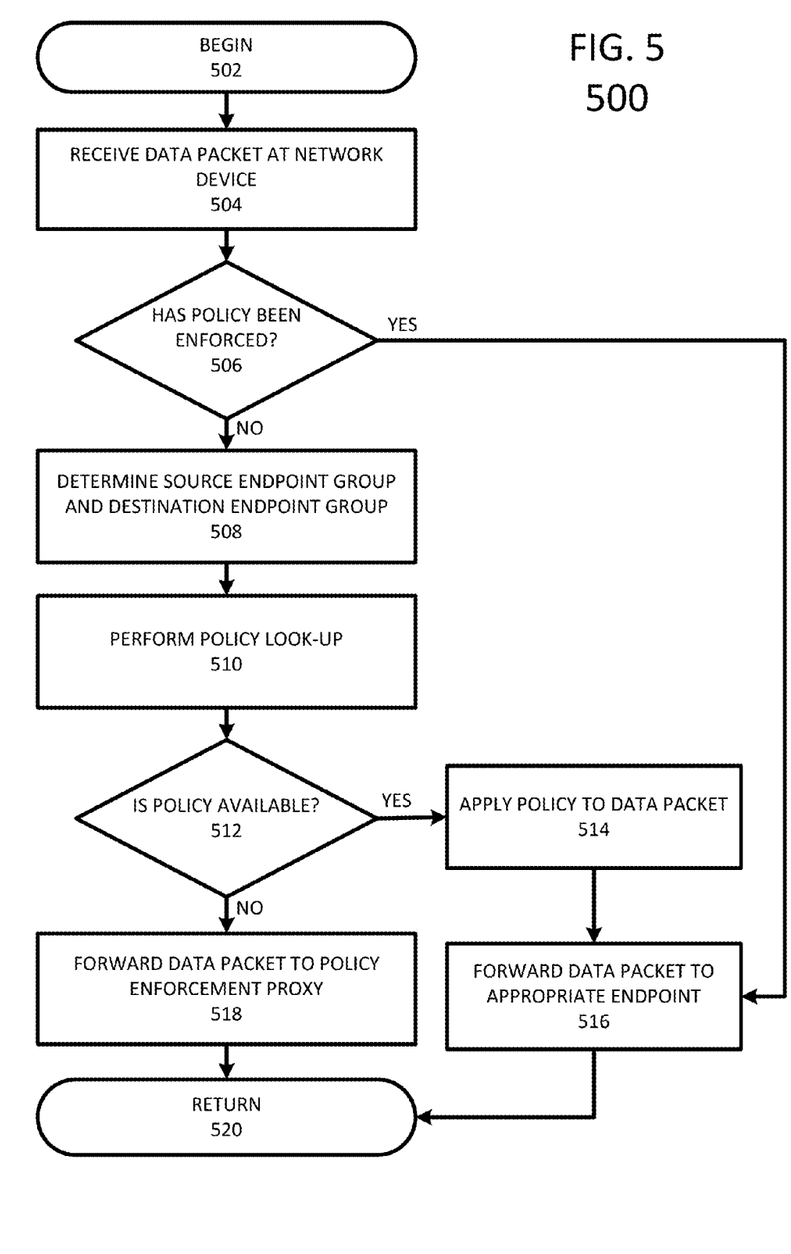
FIG. 5 illustrates an example method for a policy enforcement proxy according to some aspects of the subject technology.

Having disclosed some basic system components and concepts, the disclosure now turns to the exemplary method embodiment shown in FIG. 5. For the sake of clarity, the method is described in terms of a network device 110, as shown in FIG. 1, configured to practice the method. The steps outlined herein are exemplary and can be implemented in any combination thereof, including combinations that exclude, add, or modify certain steps.

Method 500 begins at step 502 and continues to step 504 in which a data packet is received at a network device 110. In one example, the data packet can be received at a leaf switch $304_N$ that is part of network fabric 312. The leaf switch $304_N$ can be responsible for performing routing and policy enforcement functions. The leaf switch $304_N$ can include a memory device 161 where it stores the policy table. In one example, the data packet can be received at a leaf switch $304_N$ that serves as the ingress switch for the data packet to network fabric 312. Alternatively, the data packet can be received at a leaf switch $304_N$ that serves as the egress switch for the data packet from network fabric 312.

After the data packet is received by the network device at step 504, the method continues to 506 where the network device determines if a policy has already been enforced on the data packet. In some embodiments, the data packet can have one or more bits that are set when the policy has been applied. If the bits are set accordingly, the network device can move to step 516 and forward the data packet to its appropriate endpoint without performing any of the policy lookup steps in method 500. For example, a leaf switch will recognize that a data packet returned from the policy enforcement proxy does not require an additional processing by the network device because the policy applied bits will have been set by the policy enforcement proxy. Similarly, in some cases an ingress leaf switch may be able to perform the policy functions prior to forwarding the data packet to the egress leaf switch and will also mark the policy applied bits to avoid duplicating effort at a downstream switch.

Alternatively, if the policy has not been enforced then the method 500 continues to step 508 where the network device determines a source endpoint group (sEPG) and a destination endpoint group (dEPG) for the data packet. An endpoint group is a collection of similar endpoints 310 that require similar policy. A policy defines the allowed communication between endpoints according to the groups they belong to. A collection of endpoints can be associated with an endpoint group based on a number of different characteristics. For example, an endpoint group can be based on a subnet, an internet protocol (IP) address, a virtual local area network (VLAN), a virtual extensible local area network (VXLAN), a media access control (MAC) address, a domain name server (DNS) name or range, network services, security services, network storage, etc. or any combination thereof. Those that are skilled in the art will recognize that endpoint groups are very flexible and can be defined based on any number of different factors. Endpoint groups (EPGs) can be used to efficiently define policy within a network. By defining policies according to EPGs rather than individual endpoints, the scalability of the policy table is greatly increased.

The network device can determine the sEPG and the dEPG by analyzing the data packet to identify the originating endpoint and the destination endpoint and their respective groups. A network device serving as the ingress leaf switch can identify the sEPG for all endpoints that are attached to it. Furthermore, in some instances the ingress leaf switch may also be able to identify the dEPG based on the characteristics of previous network traffic saved or cached at the particular ingress switch. Alternatively, if the ingress switch is not able to identify the dEPG, it can tag the data packet with the appropriate sEPG and forward it to a spine switch $302_N$ for further routing. The data packet will then be routed through the fabric and arrive at an appropriate egress leaf switch that is associated with the destination endpoint. The egress leaf switch can extract the sEPG information from the data packet because it was previously added by the ingress leaf switch. The egress leaf switch can also identify the dEPG because that endpoint is attached to the egress leaf switch.

Once the sEPG and the dEPG are identified, the method 500 proceeds to step 510 where the network device performs a policy lookup. As discussed above, policies define the nature of communications between EPGs. An example of a policy may be to allow traffic between two endpoint groups. Another example of a policy may be to make a copy of data packets between two endpoint groups. As one that is skilled in the art will recognize, a policy is a flexible tool that can be used to define numerous functions within a network. Other examples of policies include redirect, deny, change quality of service (QoS), encrypt, drop, etc.

A network device can perform a policy lookup by accessing the policy table stored on its local memory device. In one embodiment, a policy table can be stored using a ternary content-addressable memory (TCAM). By using a TCAM, the network device can determine if a policy is present in a single lookup operation. Alternatively, the network device may use other forms of memory such as RAM, Flash, EEPROM, etc. to store the policy table.

Figure 6:
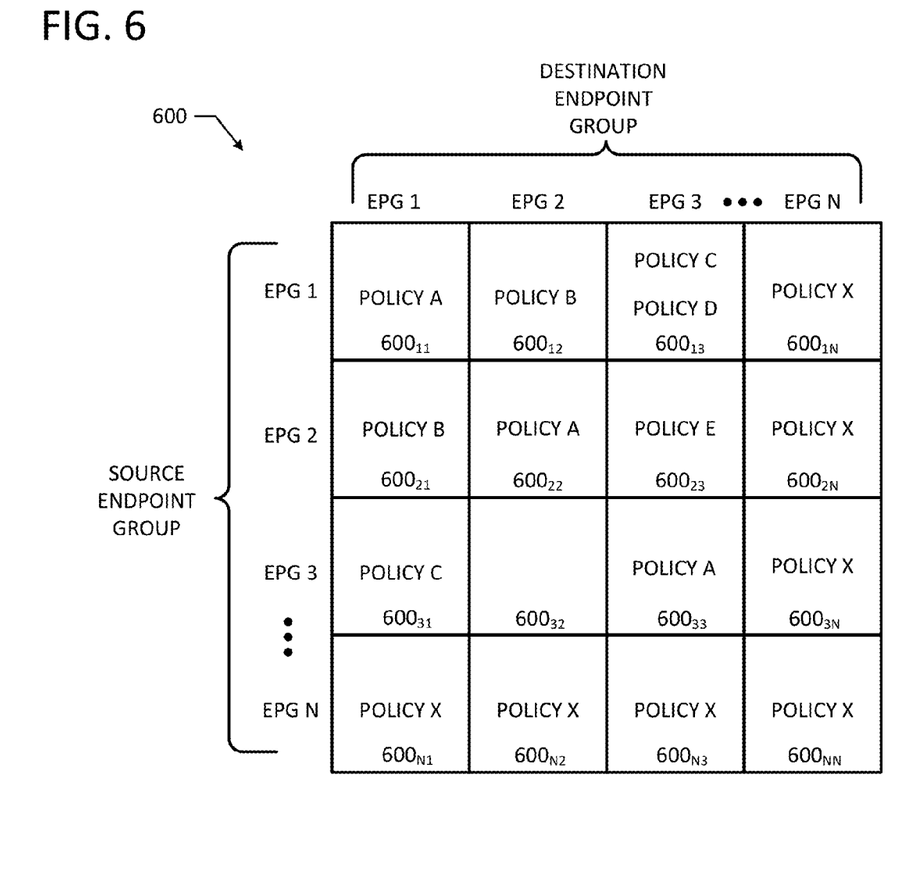
FIG. 6 illustrates an example of a matrix of policies among endpoint groups.

The policy lookup is based on the sEPG and the dEPG. FIG. 6 illustrates an example of a matrix 600 of policies among endpoint groups. The matrix form in FIG. 6 is used for ease of readability and to facilitate the understanding of how a policy table works. However, a policy table need not be stored in a matrix format or any particular type of data structure. In matrix 600, each box lists the applicable policy or policies between a particular source endpoint group and a destination endpoint group. In one example, the network device can perform a lookup for sEPG=EPG 1 and destination EPG=EPG 1 to determine the appropriate policy for a packet that is traveling from an endpoint that is part of EPG 1 to an endpoint that is also part of EPG 1. Accordingly, box $600_{11}$ dictates that "Policy A" should be applied to traffic that travels from an endpoint that is part of EPG 1 to and an endpoint that is also part of EPG 1. Policy A may correspond to a policy that allows traffic to travel between the endpoints.

In some embodiments, the same policies are applied in a bidirectional fashion. For example, box $600_{12}$ provides for "Policy B" to be applied to traffic from EPG 1 to EPG 2, and box $600_{21}$ provides for "Policy B" to also be applied to traffic from EPG 2 to EPG 1. Alternatively, policies can be applied differently for data that is going in one direction versus another. For example, box $600_{13}$ provides for both "Policy C" and "Policy D" to be applied to traffic from EPG 1 to EPG 3 while box $600_{31}$ provides only for "Policy C" to be applied to the data that travels in the opposite direction, from EPG 3 to EPG 1. Here, "Policy C" may be used to allow traffic to flow in both directions. However, "Policy D" may be used to change the quality of service (QoS) of the traffic in only one of the directions.

In some embodiments, a network can control data traffic by using a whitelist model wherein a policy must be present to allow communication. For example, box $600_{32}$ defines the policies that govern traffic from EPG 3 to EPG 2. However, because this box does not contain any policies, traffic would not be allowed to flow from EPG 3 to EPG 2 under a whitelist model. Conversely, box $600_{23}$ includes "Policy E" that governs traffic from EPG 2 to EPG 3. Hence, under a whitelist model, this example would allow unidirectional traffic from EPG 2 to EPG3. Alternatively, a network can employ a blacklist model in which all traffic is permitted unless a particular policy exists to prevent it.

In addition to the sEPG and the dEPG, a policy can be defined according to other characteristics. In some embodiments, a policy can be further defined in accordance with the protocol that is associated with the data packet. For example, a policy can dictate that hypertext transfer protocol (HTTP) traffic between EPG 1 and EPG 2 is allowed and that file transfer protocol (FTP) traffic should be redirected. Accordingly, the network device can analyze the data packet to determine that the transport layer (Layer 4) port number is 80, which is associated with HTTP, and permit the traffic. Similarly, the network device can redirect a data packet having a transport layer port number of 20 or 21, which is associated with FTP. Those that are skilled in the art will recognize that the applicable standards define many port numbers and the associated services. Thus, the network device can perform a policy lookup using criteria that includes the sEPG, the dEPG, and the port numbers associated with a transport layer service.

Turning back to FIG. 5, after the network device performs the policy lookup at 510, it determines if a policy is available at 512. As previously discussed, this determination can be made in a single lookup operation with the use of a TCAM. In some instances, a policy may not be available because the policy table on the memory of the network device is full and does not have room to store additional policies. Alternatively, a policy may not be available because the network device does not have the resources or capability to enforce the policy. For example, a network operator may wish to implement a new policy that requires all traffic between two EPGs to be encrypted. However, the network device may not have the hardware or software resources to perform the encryption, thus making it impractical to store the encryption policy on the network device's policy table.

If an appropriate policy is identified at 512, the method proceeds to step 514 where the policy is enforced. Enforcement of the policy may involve a number of actions such as allowing the traffic to continue, redirecting the traffic, changing the quality of service, or copying the data packet. In addition, the network device may also apply a tag to the data packet or set one or more bits in the data packet to mark the enforcement of the policy. In the case where the policy is enforced at an ingress switch, the bits or tag can be read by the egress switch and allow the packet to be forwarded without duplicating the policy enforcement process. Once the policy is applied at 514, the data packet can be forwarded to its appropriate endpoint at 516. The method then proceeds to step 520 where it returns to previous processing.

Alternatively, if the network device determines that a policy is not available, the method continues to step 518 where the data packet is forwarded to a policy enforcement proxy. The policy enforcement proxy can provide a failsafe mechanism for data packets that would otherwise be dropped in a network employing a whitelist model. The policy enforcement proxy can store network policies that could not be stored on the network device's local memory either because the memory was full or because the network device does not have the capability to enforce the policy. In some embodiments, the policy enforcement proxy can be a server that has significantly more processing and memory resources than a leaf switch. Alternatively, the policy enforcement proxy can be a separate switch that has excess computing/memory resources that can be allocated for performing the policy enforcement. Although the policy enforcement proxy can be part of the datacenter, it need not be physically collocated with the network, so long as it is communicatively coupled to the network device.

In some embodiments, the network device can modify the data packet prior to forwarding it to the policy enforcement proxy. As discussed above, the applicable policy is dictated by the sEPG and the dEPG, as well as the transport protocol. When the policy lookup is performed at an egress switch, the egress switch determines the sEPG from the tag that was applied by the ingress switch and it determines the dEPG according to the locally stored information that relates to all of its attached endpoints. If the policy is not available at the egress switch, it can modify the data packet to also include a tag that identifies the dEPG so that the policy enforcement proxy can discern all necessary information directly from the contents of the packet.

In the case of a multicast data packet, the network device can further modify the data packet to ensure proper routing after the data packet is returned from the policy enforcement proxy. For example, the network device can modify the data packet to include a source port tag that identifies the originating endpoint. In the absence of a source port tag, a multicast data packet that is returned from the policy enforcement proxy would appear to be originating from the policy enforcement proxy and could then be routed back to its source endpoint. Consequently, by modifying the multicast data packet to include a source port tag, the leaf switch can appropriately route the multicast data packet to its intended destinations after the policy is enforced and avoid returning the multicast data packet to the source.

Figure 7:
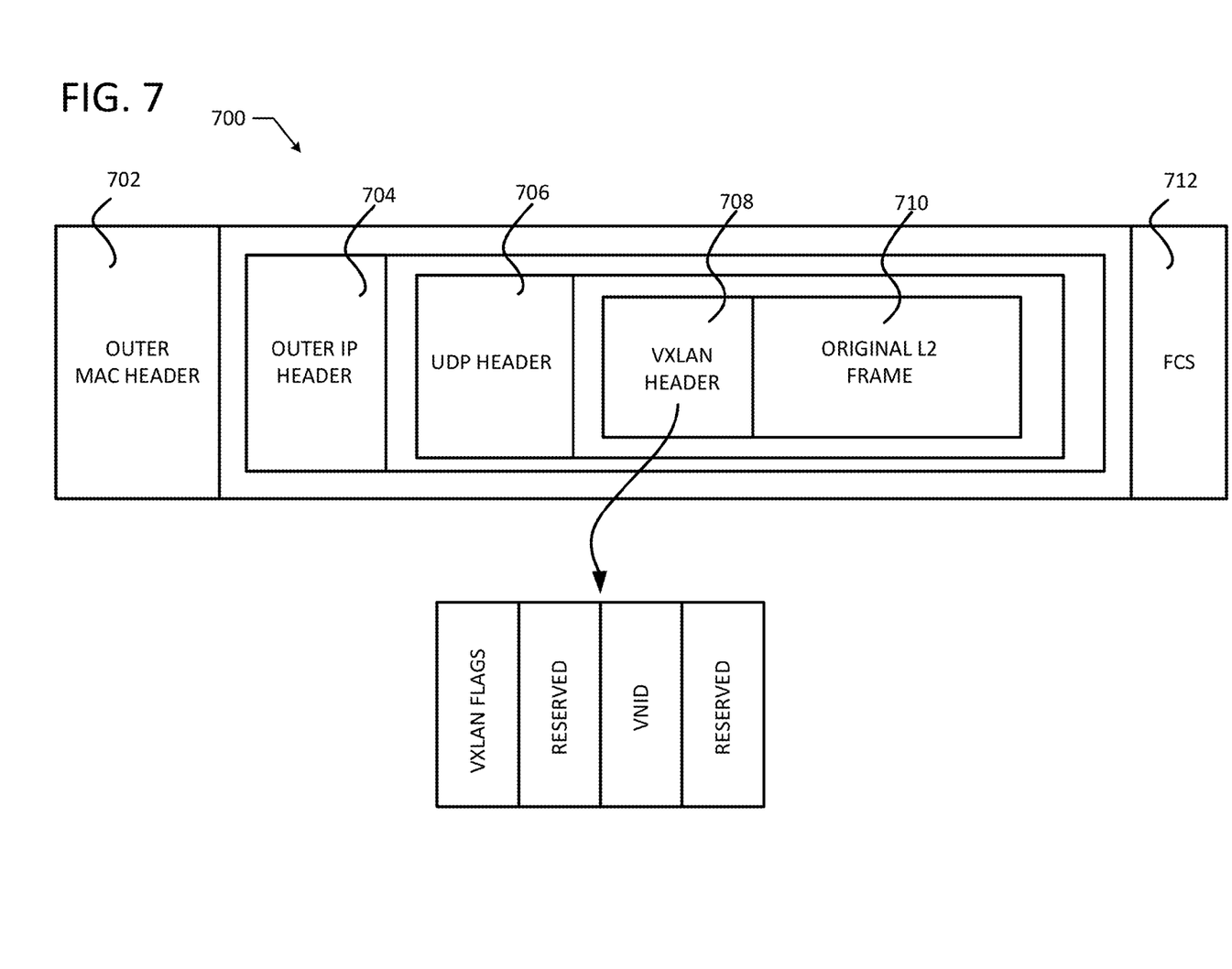
FIG. 7 illustrates an example of a virtual extensible local area network (VXLAN) data packet.

In some embodiments, the data packets are encapsulated using a virtual extensible local area network (VXLAN) packet format. FIG. 7 illustrates an example of a VXLAN data packet 700. VXLAN defines a MAC-in-UDP (media access control in user datagram protocol) encapsulation scheme where the original Layer 2 frame 710 has a VXLAN header 708 added and is then placed in a UDP-IP packet. The VXLAN header 708 is an 8 byte field which has 1 byte allocated for VXLAN flags, 3 bytes allocated to the VNID field, and 4 bytes allocated to two separate reserved fields (3 bytes and 1 byte, respectively). The VXLAN header 708 together with the original Ethernet (L2) frame is stored in the UDP payload. To avoid growing the size of the data packet, the network device can utilize the reserved fields in the VXLAN header 708 to include the tags for the sEPG, the dEPG, and in the case of a multicast data packet, the source port tag.

After the network device forwards the data packet to the policy enforcement proxy at step 518, the method continues to step 520 where it returns to previous processing, which includes repeating method 500.

Figure 8:
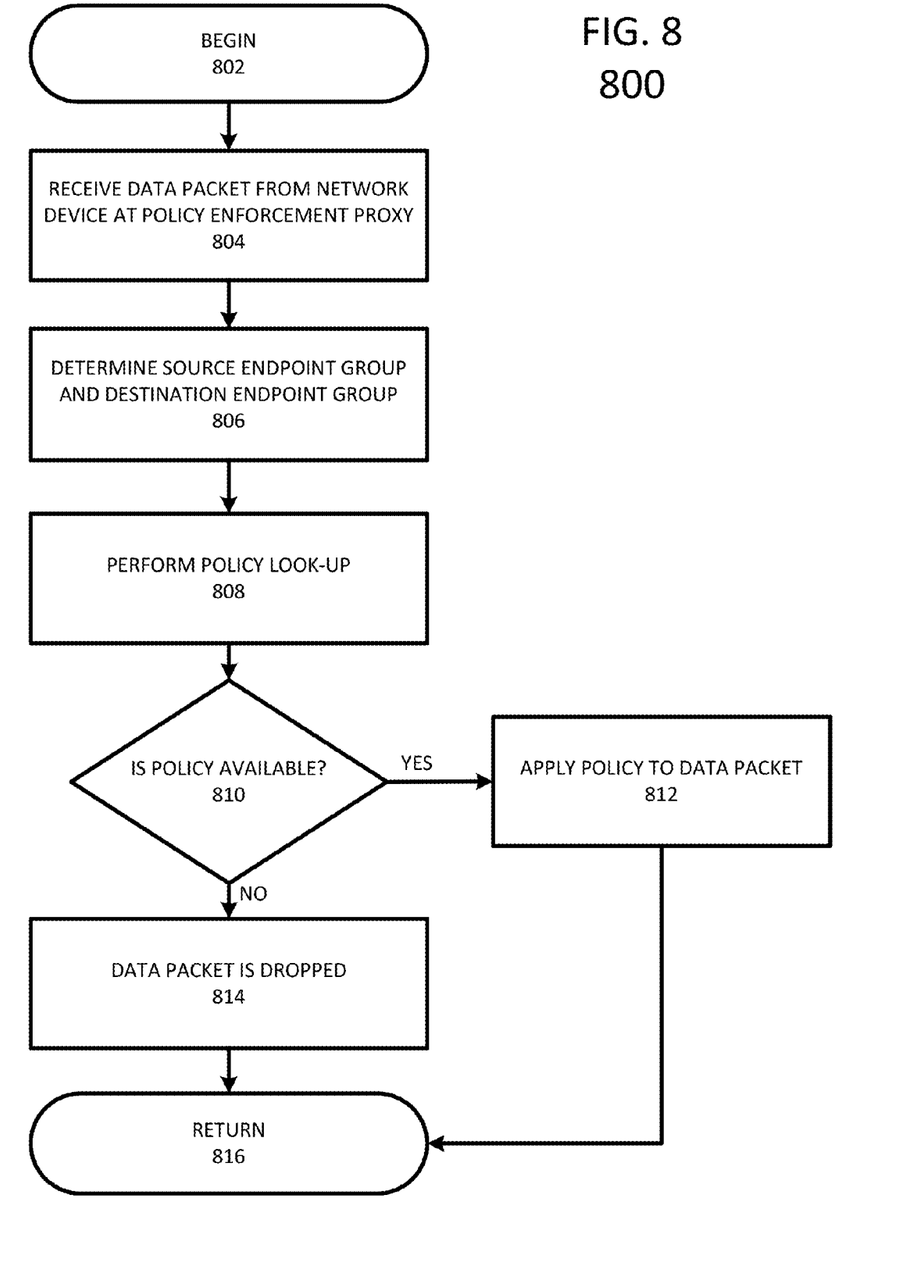
FIG. 8 illustrates an example method for a policy enforcement proxy according to some aspects of the subject technology.

Next, the disclosure turns to the exemplary method embodiment 800 shown in FIG. 8. Method 800 begins at step 802 and proceeds to step 804 in which a data packet is received at the policy enforcement proxy. As mentioned above, the policy enforcement proxy is a network device such as a server or a switch that can enhance the scale and capabilities of policy enforcement in a network. A data packet may be forwarded to the policy enforcement proxy for further processing when a switch does not have the requisite policy available locally. For example, a switch may have insufficient memory resources to store all of the policies associated with a particular network. Alternatively, a switch may not have the policy stored locally because the switch does not have the necessary processing resources to enforce the policy.

After the data packet is received at 804, the policy enforcement proxy determines the sEPG and dEPG associated with the data packet at step 806. In one embodiment, the policy enforcement proxy can de-encapsulate a VXLAN data packet and determine the sEPG and dEPG by reading one or more of the reserved fields in the VXLAN header. The sEPG and dEPG will have been tagged by the ingress switch and/or the egress switch prior to forwarding the data packet to the policy enforcement proxy. Alternatively, the policy enforcement proxy can determine the sEPG and dEPG based on the source and destination endpoint addresses contained in the data packet. In addition to the sEPG and the dEPG, the policy enforcement proxy can also determine the transport layer protocol by reading the UDP port information located in the UDP header.

After the sEPG and dEPG is determined at 806, the policy enforcement proxy has the necessary information to perform the policy lookup at step 808. As discussed above, the policy lookup is based on both the sEPG and dEPG. In some embodiments, the policy lookup can also include the transport layer protocol. The policy enforcement proxy can perform the policy lookup in either hardware or software. For example, the policy table can be stored on a TCAM that can return the appropriate policy in a single hardware lookup operation. Alternatively, the policy lookup can be performed by a software function that parses one or more data structures stored in a conventional memory device such as RAM, CACHE, FLASH, etc. After the lookup is performed, the policy enforcement proxy determines whether a policy is available at step 810. If there is no matching policy available, the data packet can be dropped at 814 and the method returns to previous processing at 816. In some embodiments, if no policy is available at the policy enforcement proxy, a message can be sent to inform the originating endpoint that the data packet did not reach its destination endpoint.

If the policy enforcement proxy determines that a policy is available at 810, the method 800 proceeds to step 812 where the policy is applied to the data packet. Application of the policy can involve copying the data packet, redirecting the data packet, allowing the data packet, denying the data packet, dropping the data packet, encrypting the data packet, or changing the quality of service of the data packet. Those skilled in the art will appreciate that a policy can be designed to perform any number of functions in a network. In some instance, the policy enforcement proxy can include hardware or software resources that are superior to those available on a network switch. Thus, the policy enforcement proxy can be configured to enforce policies that encompass sophisticated operations which were previously not available to the network.

The policy enforcement proxy can also modify certain fields or bits within the data packet to indicate that the policy has been applied to the data packet. Accordingly, if the data packet is subsequently sent to another network switch, it can be routed to its destination endpoint without the need for additional processing. After the policy applied bits are set in the data packet, the policy enforcement proxy can re-encapsulate the data packet and forward it to the appropriate switch. In some embodiments, encapsulation of the data packet can be done using a VXLAN packet as illustrated in FIG. 7. In some instances, the data packet will not be returned to the switch that sent it to the policy enforcement proxy because the policy dictates a different action. For example, a policy may require that a data packet be redirected or dropped, in which case the policy enforcement proxy can perform the required acts without sending the data packet back to the same egress switch from which it came.

After the policy enforcement proxy applies the policy to the data packet at 812, the method continues to step 816 where the policy enforcement proxy returns to previous processing, which includes repeating method 800.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

For clarity of explanation, in some instances the present technology may be presented as including individual functional blocks including functional blocks comprising devices, device components, steps or routines in a method embodied in software, or combinations of hardware and software.

Note that in certain example implementations, the optimization and/or placement functions outlined herein may be implemented by logic encoded in one or more tangible, non-transitory media (e.g., embedded logic provided in an application specific integrated circuit [ASIC], digital signal processor [DSP] instructions, software [potentially inclusive of object code and source code] to be executed by a processor, or other similar machine, etc.). The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, by a network device, comprising:
receiving a data packet;
determining a source endpoint group (sEPG) and a destination endpoint group (dEPG) for the data packet;
determining whether a policy for the data packet has been enforced, based on whether one or more status bits from the data packet that represent the policy are set;
in response to determining that the policy has been enforced, forwarding the data packet to the dEPG;
in response to determining that the policy has not been enforced:
performing a lookup for the policy in a storage of the network device for the data packet, based on the sEPG and the dEPG;
in response to finding the policy in the storage, applying the policy to the data packet, and forwarding the data packet to the dEPG; and
in response to not finding the policy stored on the network device, forwarding the data packet to a policy enforcement proxy.

2. The method of claim 1, further comprising:
receiving the data packet from the policy enforcement proxy;
determining that the policy has been enforced; and
forwarding the data packet to a destination endpoint.

3. The method of claim 1, wherein the sEPG and the dEPG are based on at least one of a subnet, an internet protocol (IP) address, a virtual local area network (VLAN), or a media access control (MAC) address.

4. The method of claim 3, wherein the policy is further based on a protocol associated with the data packet, wherein the protocol is determined according to a port number.

5. The method of claim 1, wherein the network device has insufficient memory resources to store the policy.

6. The method of claim 1, wherein the network device has insufficient hardware resources to enforce the policy.

7. The method of claim 1, wherein the policy is one of redirect, deny, allow, change quality of service (QoS), encrypt, drop, or copy.

8. The method of claim 1, wherein the data packet is a multicast data packet and the modifying further comprises adding a source port tag to the multicast data packet, wherein the source port tag and the destination group tag are stored in a virtual extensible local area network (VXLAN) header.

9. A system comprising:
a processor; and
a computer-readable storage medium having stored therein instructions which, when executed by the processor, cause the processor to perform operations comprising:
receive a data packet from a network device that is responsible for forwarding the data packet to a destination endpoint;
determine whether a policy for the data packet has been enforced, based on whether one or more status bits from the data packet that represent the policy are set;
in response to determining that the policy has been enforced, forward the data packet to the dEPG;
in response to determining that the policy has not been enforced:
perform a lookup for the policy in a storage of the network device for the data packet, based on the sEPG and the dEPG;
in response to finding the policy in the storage, apply the policy to the data packet, and forwarding the data packet to the dEPG; and
in response to not finding the policy stored on the network device, forward the data packet to a policy enforcement proxy.

10. The system of claim 9, the computer-readable storage medium storing additional instructions which, when executed by the processor, result in an operation further comprising:
modify at least one field in the data packet indicating that the policy has been enforced;
re-encapsulate the data packet; and
return the data packet to the network device.

11. The system of claim 9, wherein the sEPG and the dEPG are based on at least one of a subnet, an internet protocol (IP) address, a virtual local area network (VLAN), or a media access control (MAC) address.

12. The system of claim 9, wherein the network device has insufficient memory resources to store the policy.

13. The system of claim 9, wherein the network device has insufficient hardware resources to enforce the policy.

14. The system of claim 9, wherein the policy is one of redirect, deny, allow, change quality of service (QoS), encrypt, drop, or copy.

15. The system of claim 10, wherein the data packet is a multicast data packet addressed to a plurality of endpoints and wherein the multicast data packet comprises a source port tag identifying an originating endpoint.

16. A non-transitory computer-readable storage medium having stored therein instructions which, when executed by a processor, cause the processor to perform operations comprising:
receiving a data packet at a network device;
determining a source endpoint group (sEPG) and a destination endpoint group (dEPG) for the data packet;
determining whether a policy for the data packet has been enforced, based on whether one or more status bits from the data packet that represent the policy are set;
in response to determining that the policy has been enforced, forwarding the data packet to the dEPG;
in response to determining that the policy has not been enforced:
performing a lookup for the policy in a storage of the network device for the data packet, based on the sEPG and the dEPG;
in response to finding the policy in the storage, applying the policy to the data packet, and forwarding the data packet to the dEPG; and
in response to not finding the policy stored on the network device, forwarding the data packet to a policy enforcement proxy.

17. The non-transitory computer-readable storage medium of claim 16, storing additional instructions which, when executed by the processor, result in operations further comprising:
determining that the data packet is a multicast data packet; and
upon determining that a policy for the data packet is not stored on the network device, modifying the data packet to include a source port tag identifying an originating endpoint.

18. The non-transitory computer-readable storage medium of claim 17, storing additional instructions which, when executed by the processor, result in operations further comprising:

receiving the multicast data packet from the policy enforcement proxy;

determining that the policy has been enforced;

identifying the originating endpoint of the multicast data packet; and multicasting the data packet to a plurality of endpoints, wherein the plurality of endpoints excludes the originating endpoint.

19. The non-transitory computer-readable storage medium of claim 16, wherein the sEPG and the dEPG are based on at least one of a subnet, an internet protocol (IP) address, a virtual local area network (VLAN), or a media access control (MAC) address.

20. The non-transitory computer-readable storage medium of claim 16, wherein the network device has insufficient hardware resources to enforce the policy.

\* \* \* \* \*